J. M. WHITHAM.
Draftsman's Protractors.
No. 6,856.
Patented Nov. 6, 1849.
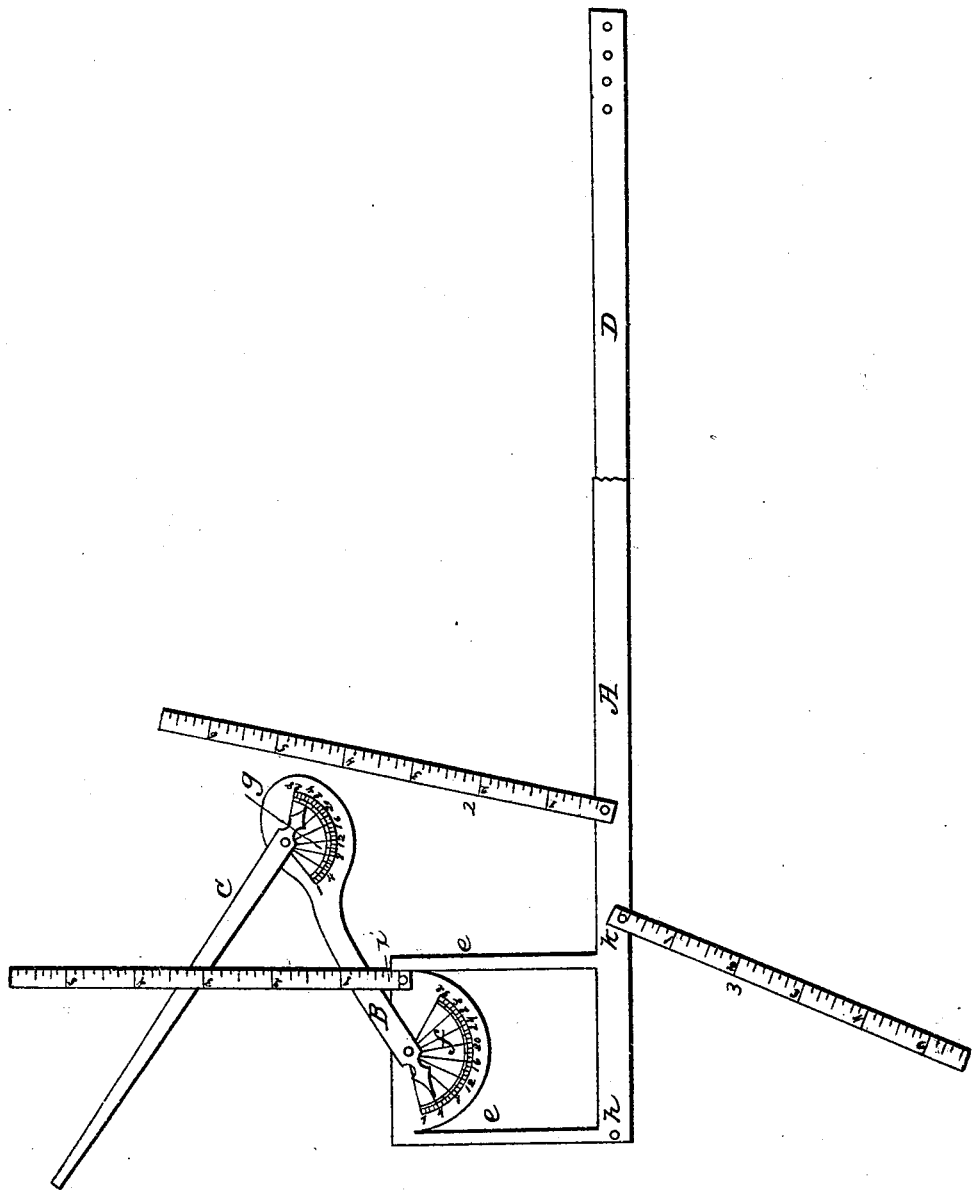

UNITED STATES PATENT OFFICE.

JAMES M. WHITHAM, OF WASHINGTON, PENNSYLVANIA.

TAILOR'S MEASURE.

Specification of Letters Patent No. 6,856, dated November 6, 1849.

*To all whom it may concern:*

Be it known that I, JAMES M. WHITHAM, of Washington, in the county of Washington and State of Pennsylvania, have invented a new and useful Machine for Taking the Exact Measurement of the Body, called a "Symmetrical Rule"; and I do hereby declare that the following is a full, clear, and exact description of the construction and operation of the same, reference being had to the annexed drawing making a part of this specification, which is a perspective view.

A, B and C are the principal sections and are made of sheet brass.

A, the first section, is $\frac{7}{8}$ of an inch wide and 18 inches long, at the left end are two perpendicular uprights, $e$, $e$, $\frac{3}{8}$ of an inch wide, $3\frac{1}{2}$ inches high and $3\frac{1}{2}$ inches apart, supporting a dial marked $f$, which is laid off in degrees or angles from 1, to 32, its semi-diameter is $1\frac{1}{2}$ inches from the center or pivot.

B, the second section, is $\frac{1}{2}$ inch wide, and 6 inches long from the pivot in the center of the dial $f$ to the pivot in the center of the dial $g$, on the end of B, is of an irregular form, is attached to the dial $f$ by a pivot and the end forms a hand designating the degree or angle on said dial. The dial $g$ is on the lower edge of the upper end of B, is laid off in degrees from 1 to 28, its semi-diameter is $1\frac{1}{2}$ inches from the center.

C, the third section, is $\frac{1}{2}$ inch wide where it attaches by a pivot to the dial $g$, $\frac{1}{4}$ inch wide at the outer end and 10 inches long. The end attached to the dial $g$ forms a hand designating the degree or angle on said dial.

D, is a morocco band attached to the right end of A and of the same width and 2 feet 4 inches long, with holes in it to fasten on the pin $h$ in the other end of A.

1, 2 and 3 are tape measures laid off in inches and parts and 18 inches long. 1 is attached to a pin or button $i$ at the upper part of the inside of the dial $f$, and is for taking the measurement over the shoulder to the socket bone of the neck, the center of the shoulder and shoulder point. 2 is attached to a pin or button $j$, on A, $3\frac{3}{4}$ inches from the inside upright $e$, and is for taking the measurement to the center of the shoulder point, to the center between the shoulders and to the socket bone of the neck. 3 is attached to a pin or button $k$ on A 1 inch from the inside upright $e$ and is for taking the measurement over the blade bone, to the waist, to artificial waist, to the hip and to the center of the breast.

The angles and measurement are taken with the rule by placing A under the left arm, the inside upright, $e$, resting against the front of the shoulder, passing D around the chest and fastening it on the pin, $h$, in the front end of A, thus securing it to its proper place. B is passed over the middle of the shoulder, the hand at the lower end working on the dial $f$ designating the proper angle, on that dial over the middle of the shoulder C is passed across to the socket bone of the neck, its hand working on the dial $g$, designates the proper angle to find the shoulder point. The measurements are taken with 1, 2 and 3 as above mentioned.

What I claim as my invention and desire to secure by Letters Patent, is—

The arms B, and C, in the symmetrical rule, in combination with the dial plates $f$ and $g$, to which they are attached by pivot joints, and herein described and represented.

JAMES M. WHITHAM.

Witnesses:
JAS. B. RUPLE,
GEORGE W. BRICE,